United States Patent

[11] 3,575,589

[72] Inventors Farid J. Neema;
John F. Graham, Sudbury, Mass.
[21] Appl. No. 777,409
[22] Filed Nov. 20, 1968
[45] Patented Apr. 20, 1971
[73] Assignee Honeywell Inc.
Minneapolis, Minn.

[54] ERROR RECOVERY APPARATUS AND METHOD
19 Claims, 6 Drawing Figs.

[52] U.S. Cl. .......... 235/153, 340/172.5, 340/365
[51] Int. Cl. .......... G06f 11/00
[50] Field of Search .......... 235/153; 340/172.5, 365; 178/79

[56] References Cited
UNITED STATES PATENTS

| | | | |
|---|---|---|---|
| 3,105,636 | 10/1963 | Greene | 235/153X |
| 3,289,176 | 11/1966 | Garth, Jr. | 340/172.5 |
| 3,296,369 | 1/1967 | Clark | 340/365X |
| 3,361,875 | 1/1968 | Banfalvi et al. | 178/79X |
| 3,403,225 | 9/1968 | Mislan et al. | 340/172.5X |

*Primary Examiner*—Malcolm A. Morrison
*Assistant Examiner*—Charles E. Atkinson
*Attorneys*—Fred Jacob and Leo Stanger

ABSTRACT: A method and apparatus for indicating the occurrence of, and procedure for correcting an error in an information processing device, by classifying various types of errors in accordance with various error recovery procedures to be used by an operator to correct such errors, and providing indications of such errors which specify which of a plurality of error recovery procedures is to be used to correct said errors.

INVENTORS
FARID J. NEEMA
JOHN F. GRAHAM
BY Fred Jacob
ATTORNEY.

INVENTORS
FARID J. NEEMA
JOHN F. GRAHAM
BY Fred Jacob
ATTORNEY.

INVENTORS
FARID J. NEEMA
JOHN F. GRAHAM
BY Fred Jacob
ATTORNEY.

INVENTORS
FARID J. NEEMA
JOHN F. GRAHAM
BY Fred Jacob
ATTORNEY.

ERROR RECOVERY APPARATUS AND METHOD

BACKGROUND OF INVENTION

This invention relates to error indicating and recovery procedure and more particularly to apparatus capable of detecting the occurrence of an error and indicating to an operator the required procedure for correction of that error in keyboard-input information processing apparatus.

Generally, information processing devices such as computers, keypunch machines, and verifying machines indicate the occurrence of an error by visual, aural or other means. In keypunch and verifying machines typical errors include striking more than one key at a time, and, comparison errors and parity errors. Such error indications only inform the operator that an error has occurred, not what the error is or how it may be corrected. In order to establish these facts the operator must refer to his knowledge of what input he was delivering to the device at the time of the error, to his experience with the device, and to various instruction manuals associated with the devices. This procedure may be arduous and time-consuming especially when inexperienced operators are involved. The accumulated time loss from many such occurrences may be costly in terms of operator labor and job delay.

Recently, information processing devices, particularly key-to-tape recording devices, have been developed which indicate that an error has occurred and also identify that error. However, the operator must still refer to his own experience with the device and/or to an instruction manual of some sort to determine what procedures are required to recover from the error. Though this technique requires less time generally than when the operator must as well determine what the error was, there is still a significant and undesirable loss of time.

The problem is becoming more acute because the increasing complexity of the machines is increasing the burden on the operators and is making the training of new operators ever more difficult. Completely automatic error recovery procedures have been considered but have not as yet been generally adopted. For with such automatic operation the operator is unaware that errors are occurring, are being detected, and are being corrected. Such totally automatic procedures are undesirable because they tend to isolate the operator from the action of the particular device and thus detract from the operator's mental picture of the operation of the device which mental picture is essential to efficient use of the device. Further, such procedures leave the operator totally unprepared should an extraordinary error occur from which the apparatus is unable to recover.

SUMMARY OF INVENTION

It is therefore a primary object of this invention to provide apparatus which detects and identifies errors and indicates the error correction procedures for the plurality of different errors which can occur in an information processing device.

It is a further object of this invention to provide such apparatus in a key-to-tape information recording device.

It is a further object of this invention to provide such apparatus in which the indication of the error correction procedure appears on a visual display with the recovery steps shown in proper sequence.

It is a further object of this invention to provide such apparatus requiring error detection and correction techniques simple enough to enable even inexperienced operators to effectively use the device.

It is a further object of this invention to provide such apparatus in which some types of errors are corrected automatically, while other types must be corrected by the operator in order to maintain operator control and awareness of the apparatus.

The invention can be accomplished in an information processing device which includes error processing apparatus for monitoring a predetermined set of conditions in the information processing device. In response to the presence of one or more of these conditions an error may be detected. After an error is recognized, it is classified according to the recovery procedures required to correct that error.

DISCLOSURE OF PREFERRED EMBODIMENT

Other objects, features and advantages will occur from the following description of a preferred embodiment and the accompanying drawings, in which.

Figure 1:
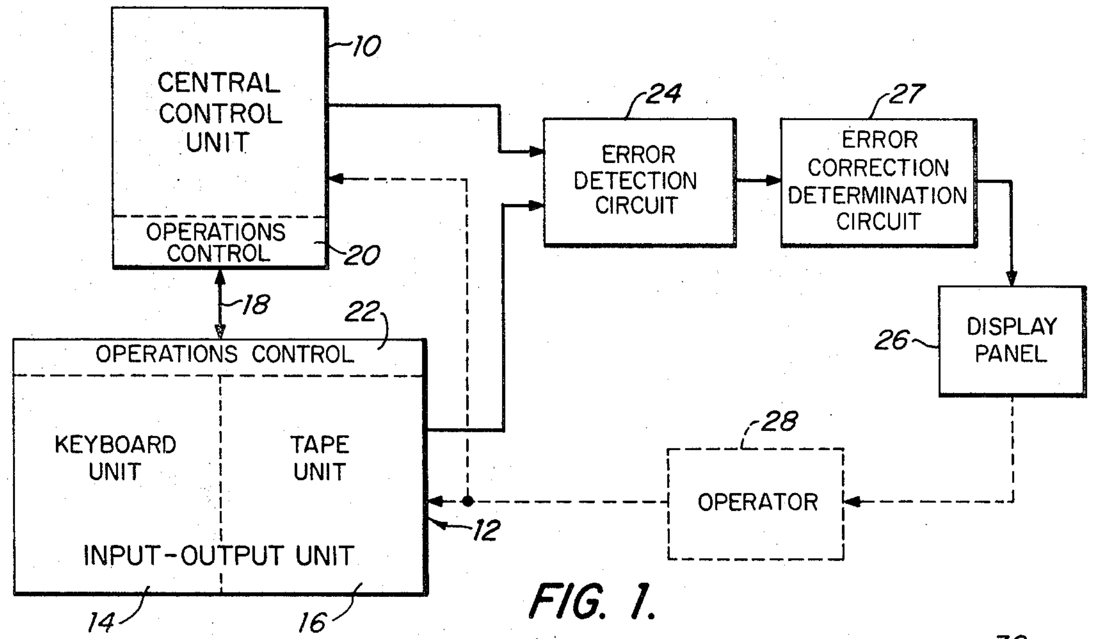
FIG. 1 is a block diagram of a key-to-tape information processing device incorporating error processing apparatus according to this invention.
Figure 2:
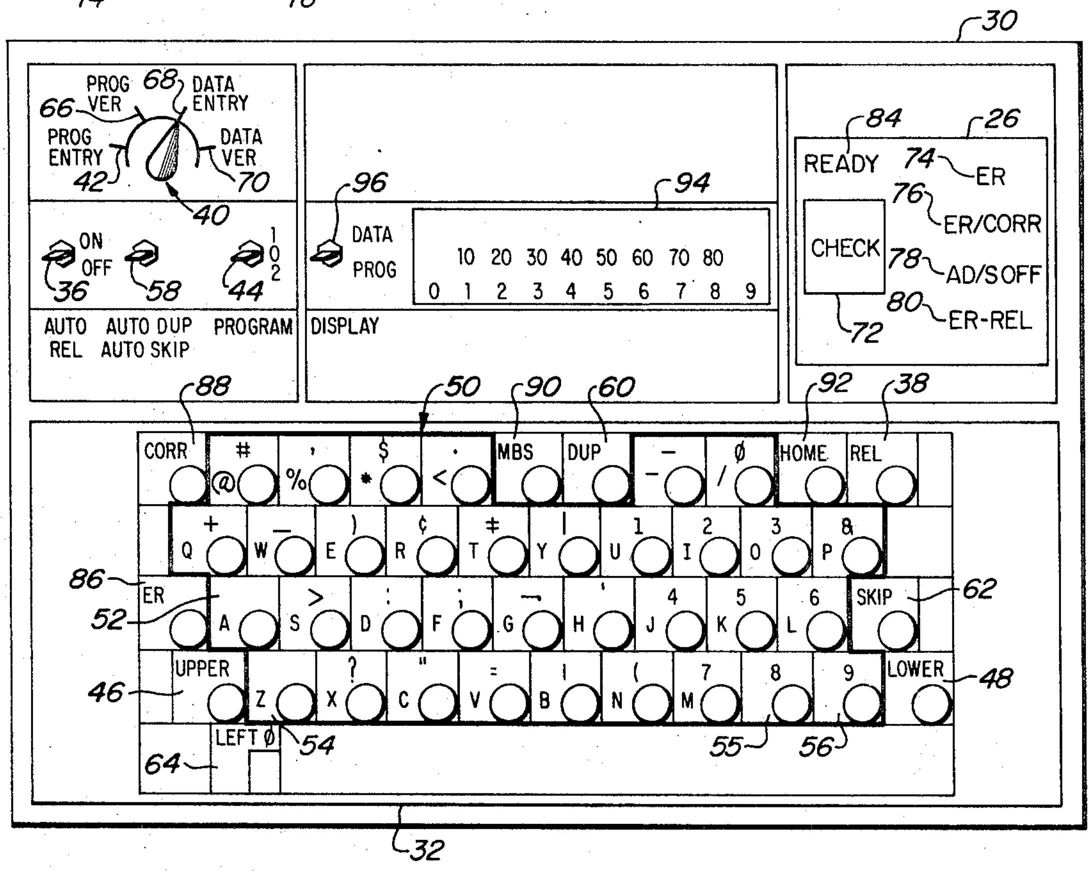
FIG. 2 is a diagram of the keyboard console of the key-to-tape information processing device of FIG. 1.
Figure 5A:
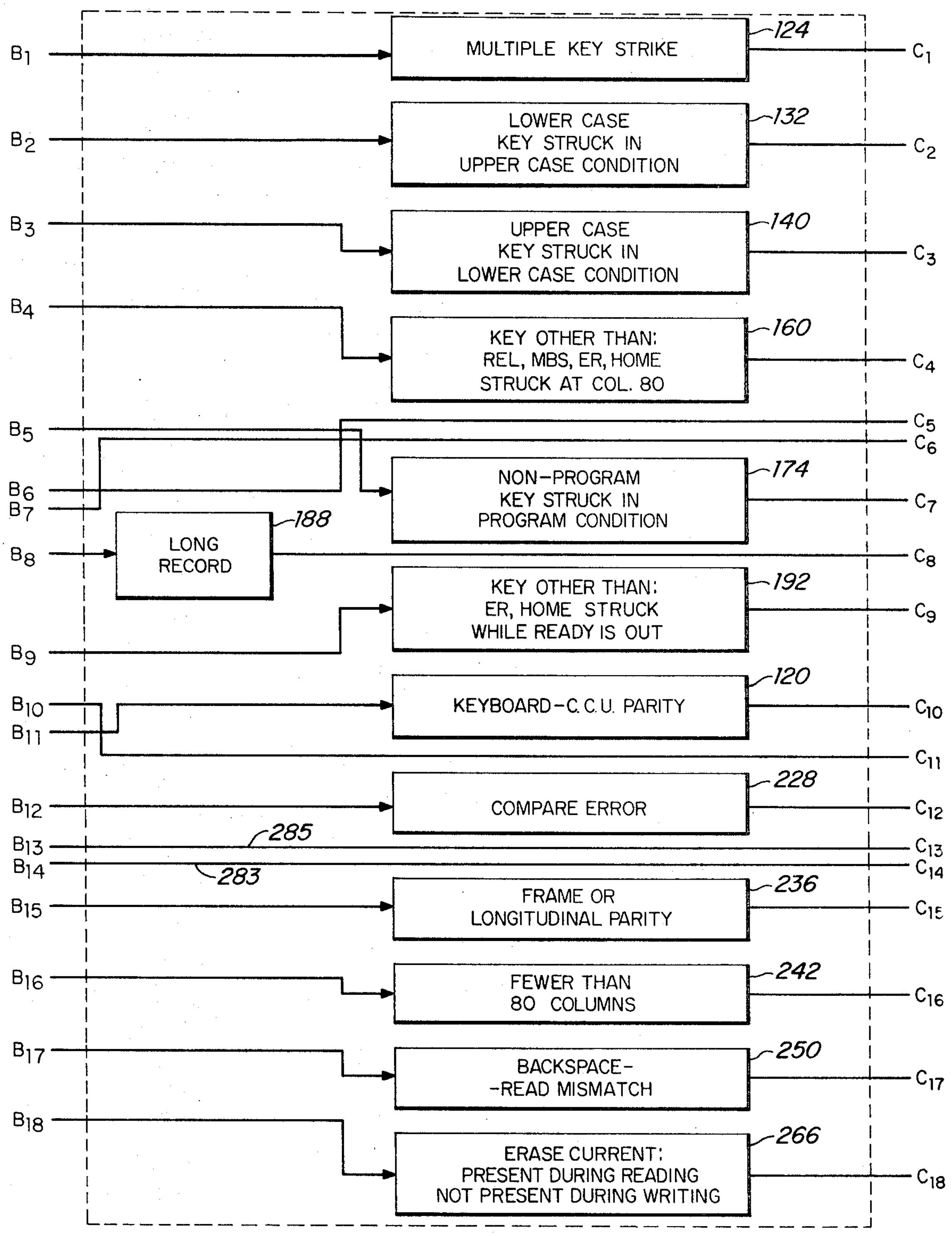
Figure 5B:
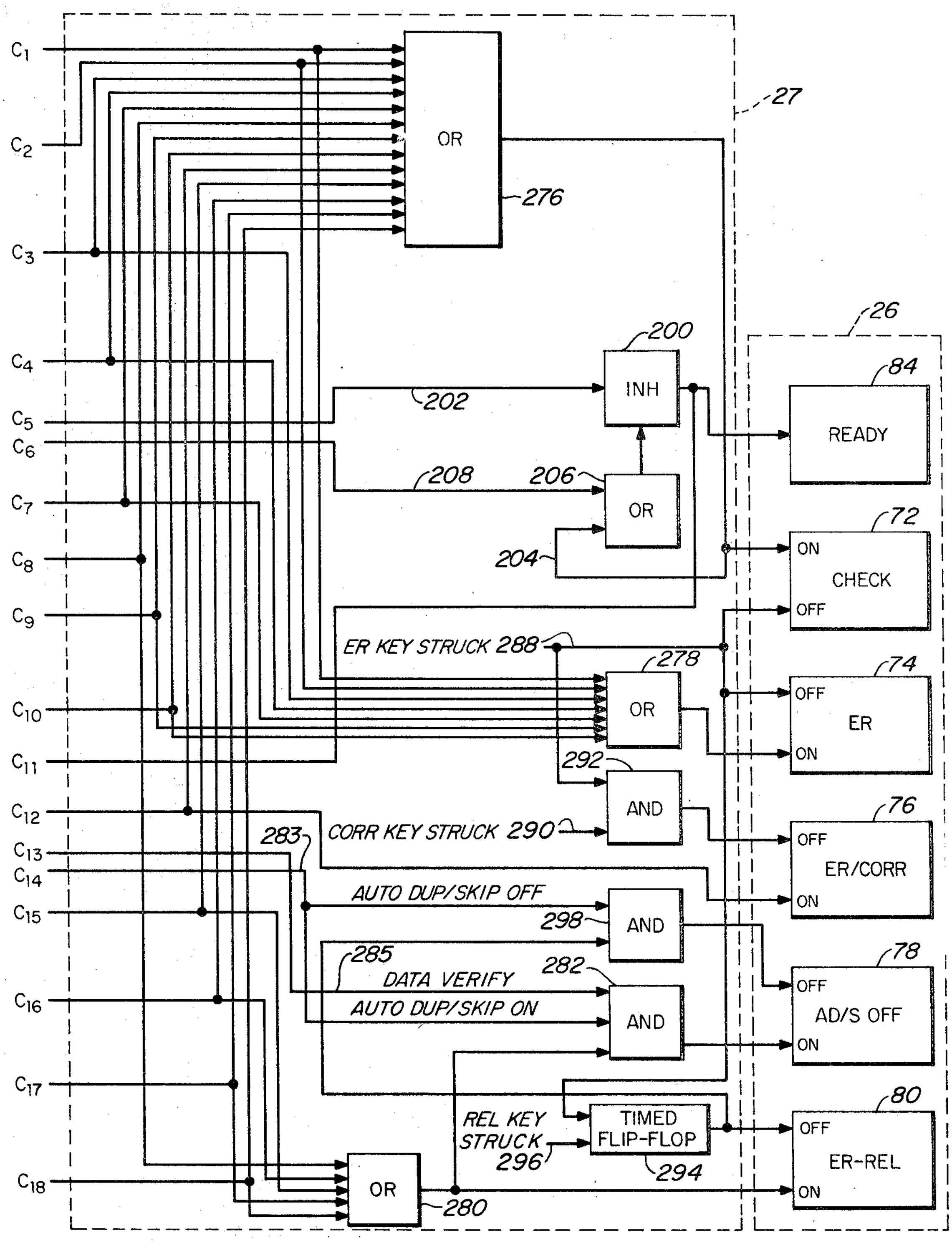

FIGS. 5*a* and 5*b* are detailed block diagrams of the error correction determination circuit shown in FIG. 1 and the display panel shown in FIG. 2 according to this invention.

The invention may be embodied in a programmable key-to-tape device having a central control unit 10, FIG. 1, and input-output unit 12 including keyboard unit 14 and tape unit 16. Communications and data transfer through line 18 between input-output unit 12 and central control unit 10, as well as internal operations of unit 10, are controlled by operations control 20. In the performance of the former function operations control 20 cooperates with operations control 22 in input-output unit 12, which also supervises communication between keyboard unit 14 and tape unit 16.

In response to the presence of one or more of a set of predetermined conditions being monitored in central control unit 10 and input-output unit 12, an error is detected by error detection circuit 24 which also identifies the type of error detected. This information is delivered to the error correction determination circuit 27 which directly resolves the error as one correctable by a particular procedure including one or more steps. That procedure is displayed visually in the form of a legend or sign on display panel 26 indicating that there has been an error. Generally, the legend or sign includes symbols corresponding to symbols on the keys or switches of keyboard unit 14. When the human operator, whose function is represented by block 28, is informed of the occurrence of an error by a visual sign on display panel 26, the operator need not decide what the error was, nor how to correct it. In accordance with this invention the operator need only read the sign on display panel 26 and strike the keys or switches corresponding to the symbols displayed in order to immediately correct the error.

In this embodiment the errors, to the correction of which this invention is addressed, are intimately involved with the various operations performed by a key-to-tape information processing device. All relevant operations are initiated and/or controlled by the operator from the console 30, FIG. 2, which includes keyboard 32 and display panel 26.

The key-to-tape device may use a record of any convenient size, for example an 80 column record containing 80 characters analogous to the common punch card. Information entered as data is stored as digital information character-by-character in a memory having 80 addressable storage locations each of which contains six bits for data information, two sets of four bits each for program information and one bit for parity. When 80 characters of data have been entered in memory, the device transfers the six data bits and one parity bit to the tape, automatically if the automatic release switch 36, FIG. 2, is on, or by the operator striking the REL key 38 if that switch is off.

Whether or not information is entered as data or program information is controlled by mode switch 40, FIG. 2, which selects any one of four modes in which the machine may operate. In program entry mode, switch position 42, all information keyed in is stored in one or the other of the two four-bit sets of program information according to the position of program selection switch 44. This switch must be in either the 1 position or the 2 position for both entry and application of one of the programs and may be in the 0 position when no program action is desired. In the program entry mode only numeric characters 0, 1, 2, 3, 4, 5 and 6 can be entered through keyboard 32. Entry of any other character results in an error because there are but seven programmable instructions. Those program instructions are as follows 0 in a column instructs that only an upper case character may be entered in the data portion of that column; 1 in a column instructs that only a lower case character may be entered in the data portion of that column; 2 in a column instructs that an automatic duplicate or skip operation or a right justify operation is to stop at that column and that only an upper case character may be entered in the data portion of that column; 3 in a column instructs that an automatic duplicate or skip operation or a right justify operation is to stop at that column and that only a lower case character may be entered in that column; 4 in a column instructs that the data field beginning at this column of the last record entered be duplicated beginning at this column on this record and that there is a lower case character in the first column of the field; 5 in a column instructs that the data field beginning at this column instructs that the data field beginning at this column is to be skipped; 6 in a column instructs that the data field beginning at this column is to be left-zero-filled (right justified) and that there is an upper case character in that column.

Automatic operations such as begun by instructions 4-duplication (DUP), 5-skip (SKIP), or 6-left-zero-fill (LEFT O), are stopped only when they encounter one of instructions 2, 3, 4, 5 and 6. Upper and lower case or upper and lower shift is analogous to those terms as applied to conventional typewriter keyboards. That is: there are two characters on most of the keys, one printed in an upper portion of the key the other on the lower portion. If the device is placed in an upper case condition either by a program instruction or manipulation of UPPER key 46, the upper character on any key struck is entered, whereas if the device is placed in a lower case condition either by a program instruction or manipulation of LOWER key 48 of the lower character on any key struck is entered. Not all the data keys, enclosed in heavy line 50, have both upper and lower characters: the A and Z keys 52, 54 have only lower characters, the 8 and 9 keys 55, 56 have only upper characters. Should such keys be struck when the device is set to a case or shift condition for which they have no character an error results. All those keys not within the area bounded by line 50 are known as control keys. When a record is programmed for DUP or SKIP those operations may be executed for an entire field automatically by the device if the AUTO DUP, AUTO-SKIP switch 58 is in the on position, otherwise they must be controlled one column at a time by means of the DUP and SKIP keys 60, 62. The LEFT-0 instruction is executed by striking the LEFT-0 key 64 which causes the data just entered to be shifted to the right until an instruction 2, 3, 4 or 5 is encountered or the end of record, column 80, is reached. The positions to the left of the shifted data are then filled zeros.

At the completion of the program entry operation, the device may be set to the program verify mode, position 66 of switch 40. The the operator then again keys in the program instructions and they are compared with those already present in memory. Any mismatch is interpreted as an error.

Data is entered with switch 40 in the data entry mode, position 68; when an entire record, 80 columns, has been entered, the six data bits plus one parity bit are transferred to a seven channel tape by nondestructive readout of memory. After the transfer is complete, the device automatically backspaces the tape and reads the data just transferred from memory to the tape. The data read from tape is compared with that still stored in memory. Any mismatch is interpreted as an error.

Verification of the entered data is accomplished in the data verify mode, position 70, of switch 40. The operator again keys in the data from the source document and that data is compared with the data previously stored on the tape. Any mismatch is interpreted as an error.

In whatever mode the machine is functioning the operator is informed of the occurrence of an error by the illumination on display panel 26 of the sign CHECK 72 and one or more of the signs ER 74, ER/CORR 76, AD/S OFF 78, and ER-REL 80. Any operation initiated from keyboard 32 when the READY sign 84 is not lit results in an error indication. It is only when that sign is illuminated that the operator may operate the machine. When that sign is out, it indicates that the tape is absent or moving, an operation is underway or an error has occurred. The signs may be constructed of selectively energizable illuminating sources in conjunction with stencil masks to form the desired legends or symbols. Each of the signs 74, 76, 78, and 80 on display panel 26 corresponds to a matching sign or legend associated with a switch on console 30 or with a key or keys on keyboard 32, which switch, key, or keys must be actuated in order to correct the error that caused the sign to be illuminated. The ER sign 74 matches the ER key 86; the ER-CORR sign 76 matches the ER key 86 and CORR key 88 which must be struck simultaneously as indicated by the slanted line displayed in the sign; the AD/S OFF sign 78 corresponds to the off position of AUTO, DUP, AUTO SKIP switch 58; the ER-REL sign 80 matches the ER and REL keys 86, 38 which must be operated sequentially as indicated by the dash between the ER and REL.

The control keys each have a special function. The REL key 38 is operative only in the data entry and verify modes to transfer data from tape to memory and from memory to tape. When depressed in the data entry mode, this key fills all remaining columns through column 80 with blanks and then transfers the data from memory to tape. In the data verify mode depression of this key causes the rest of the record to be ignored and causes the next record to be transferred from tape to memory.

The MBS (Money backspace) key 90 causes the column counter associated with the memory to be decremented by one position. The HOME key 92 clears the device by setting the column counter to one and resetting all error indicators. The CORR (column correct) key 88 enables date to be reentered in a single column. The ER key 86 has two functions: first it clears error conditions by extinguishing the CHECK sign 72 and any other visual or aural error warnings, and second it acts as an interlock to prevent certain other keys such as HOME and CORR from being inadvertently actuated. Actuation of ER key 86 extinguishes CHECK sign 72 and any other visual and aural stimuli (not shown) in order to prevent distraction of the operator but does not extinguish signs 74, 76, 78, or 80. These are kept illuminated before the operator until the error is corrected.

In whatever mode the device is operating the number of the column currently being processed is displayed on address panel 94 and either the data or program contents of that column also may be selected for display on panel 94 by means of display switch 96. In this manner the operator may view the area in which the entry or verification is being made.

Features, functions and parts of the key-to-tape recorder device not necessary to the error processing apparatus of this invention have been omitted to facilitate clarity and understanding of the invention.

The operation of the key-to-tape recorder and error processing apparatus may be better understood with reference to FIGS. 3, 4, 5*a* and 5*b* in which are shown more detailed block diagrams of the device of FIG. 1. As discussed with reference to FIG. l the operations controls 20 and 22 perform the synchronization, and general control of the entire device. For example: the automatic release switch 36, shown in block form in FIG. 3, communicates with the memory and tape and all intervening components by means of controls 20 and 22; the automatic duplicate/skip switch 58, shown in block form, communicates with the memory, to duplicate portions of a previous record in the present record, and to skip certain areas of the present record, through control 20; the program switch 44, shown in block form, communicates with the memory via control 20 to indicate which, if any, program is to receive the ensuing entries or which program is to control an operation; the data and program display switch 96, shown in block form, communicates with address panel 94 through control 20 to direct which information, program or data, is to be displayed on panel 94. Similarly, mode switch 40, whose positions are shown as blocks in FIG. 3, readies the proper memory locations and conditions other necessary circuits for the particular mode of operation through control 20. These operation controls 20 and 22 perform many functions which need not be understood to understand the invention and so explanation of them has been omitted for clarity.

Figure 3:
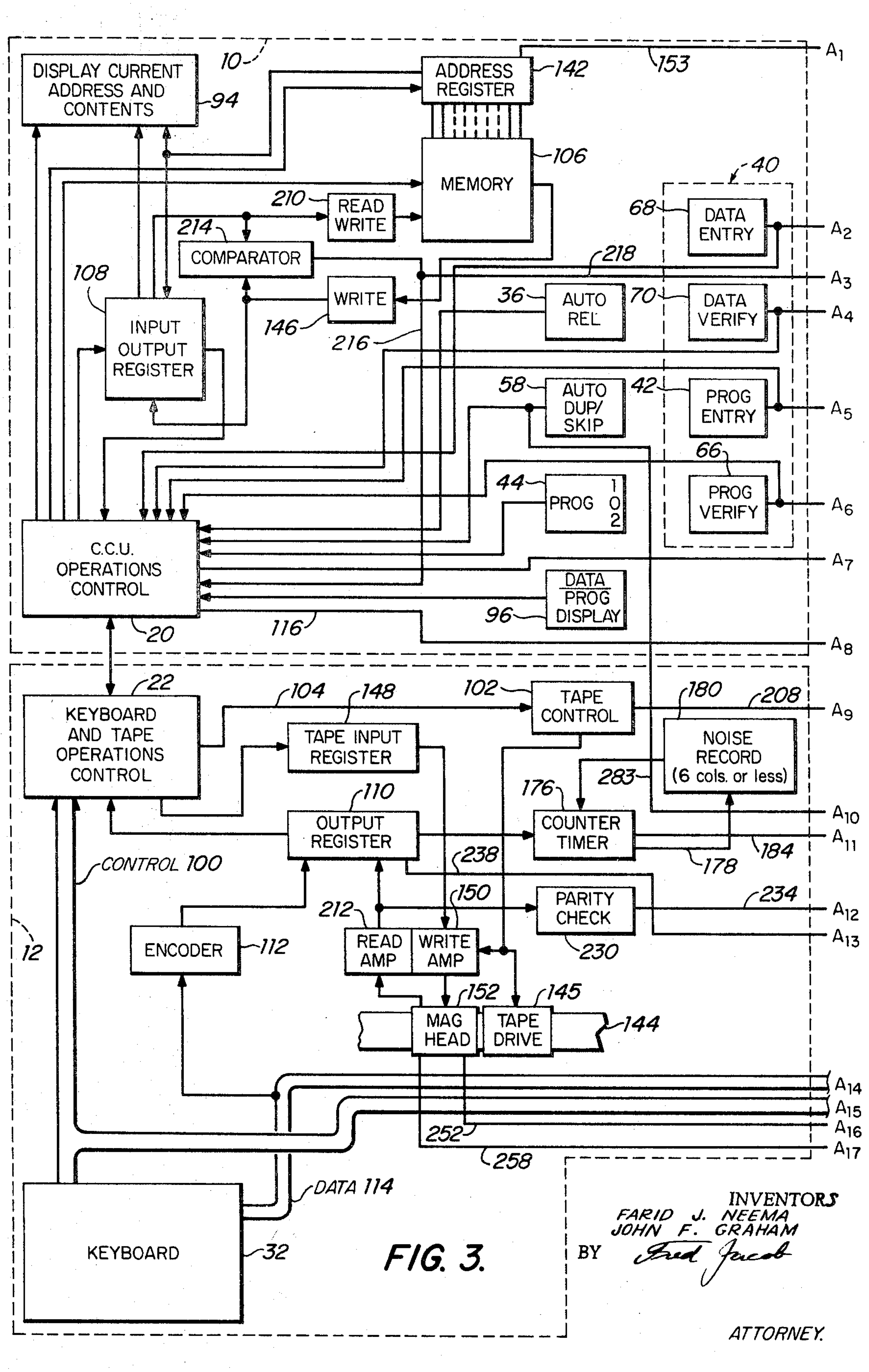
FIG. 3 is a more detailed block diagram of the central control unit and input-output unit of FIG. 1.
Figure 4:
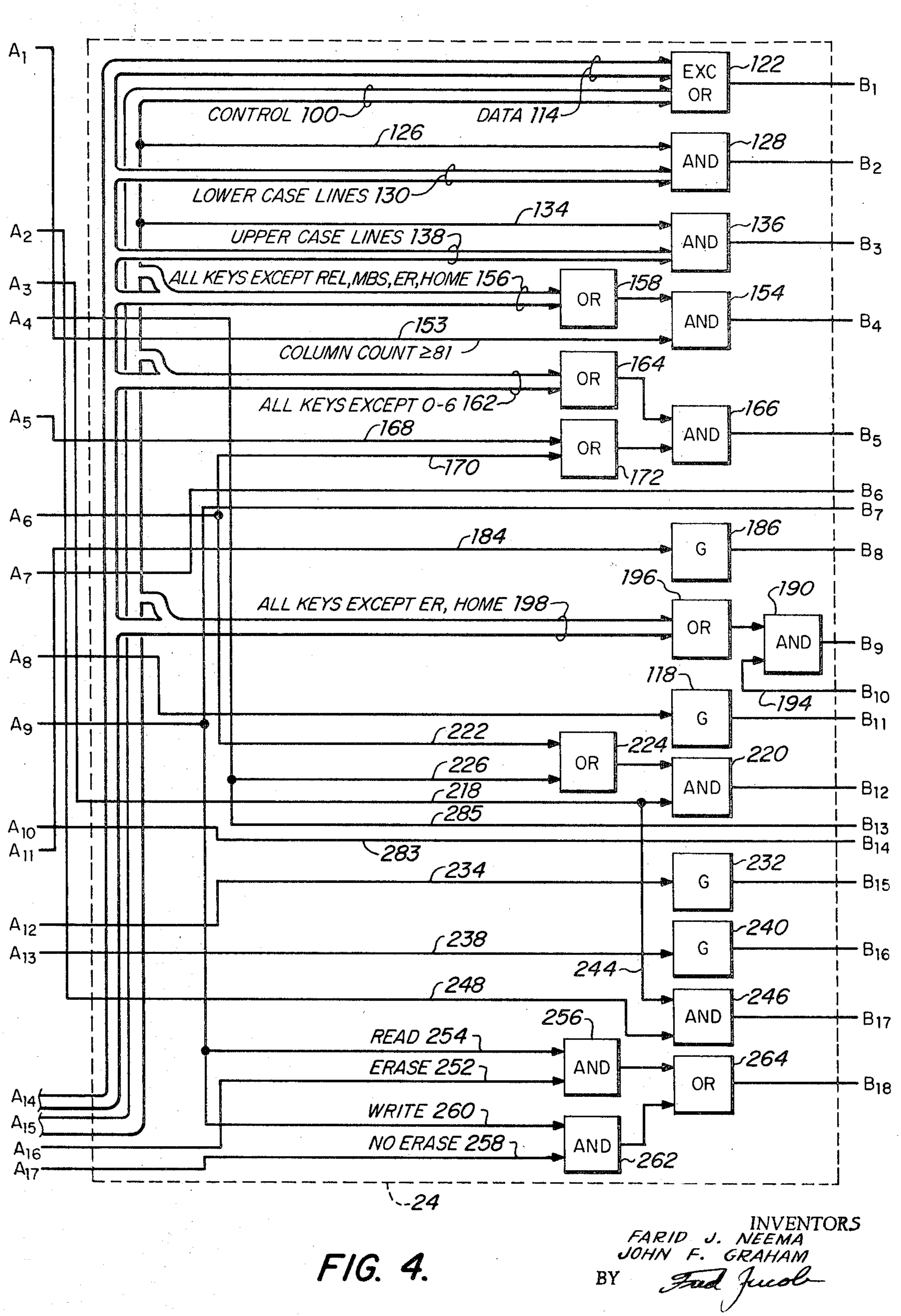
FIG. 4 is a more detailed block diagram of an error detection circuit shown in FIG. 1, according to this invention.

Each of the lines extending between FIGS. 3 and 4 is indicated by one of the designations $A_1$, $A_2$, ..., $A_{17}$ on each of FIGS. 3 and 4; each of the lines extending between FIGS. 4 and 5*a* is indicated by one of the designations $B_1$, $B_2$, ..., $B_{18}$ and each of the lines extending between FIGS. 5*a* and 5*b* is indicated by one of the designations $C_1$, $C_2$, ..., $C_{18}$ to facilitate understanding of the interconnection of the various components.

When a control key is struck on keyboard 32, the information is delivered to operations control 22 via cable 100 where it is distributed internally at the proper time or distributed to operations control 20. For example: if it is a tape-related command it is delivered to tape control 102 via line 104; if it is a memory-related command it is delivered to operations control 20 for delivery to memory 106 by means of input-output register 108.

When a data key is struck, the information is delivered via cable 114 to output register 110 by an encoder 112 which generates a code with the proper parity. That information with its parity bit is delivered to operations control 20 by control 22 and upon arrival parity is checked by control 20. The presence of an improper parity bit (signalling a failure in the encoder) at control 20 monitored by line 116 is detected by gate 118, FIG. 4, which energizes KEYBOARD-TO-C.C.U. PARITY error amplifier 120, FIG. 5*a*. If during keying more than one key was improperly struck, multiple input exclusive OR gate 122, which receives the control and data cables 100, 114, detects that more than one key was struck and energizes MULTIPLE KEY STRIKE amplifier 124. If the device is set to the upper case condition either by programmed instruction 0 or by depression of upper key 46, line 126 connected to AND circuit 128 is energized. If then any lower case key is struck, one of the lines in lower case cable 130 is energized causing AND circuit 128 to detect an error and energize the LOWER CASE KEY STRUCK IN UPPER CASE CONDITION amplifier 132. Similarly, when the device is in the lower case condition, a signal is presented on line 134 to AND circuit 136. An upper case key struck while this condition is present provides a second signal on one of the lines of cable 138 causing AND circuit 136 to detect an error and energize the UPPER CASE KEY STRUCK IN LOWER CASE CONDITION amplifier 140.

As each successive character is placed in memory 106, address register 142 is incremented by one count. When the count reaches 80, the record is complete and memory is full. After this count is reached only one of four operations of the machine may be initiated. First, by actuation of REL key 38 the information in memory 106 may be released to tape 144 driven by tape drive 145 through write gate 146, input-output register 108, operations controls 20 and 22, input register 148, write amplifier 150 and magnetic head 152. Second, the address register 142 may be decremented one column or count at a time by depression of MBS key 90. Third, the ER key 86 may be depressed to initiate error correction; and fourth, the HOME key 92 may be struck to clear the device and reset the address register to a count of one. When register 142 has attained a count of 80 or more, a signal is provided on line 153 to AND circuit 154. If at this time any key except the REL, MBS, ER, or HOME keys are struck a signal is provided on one of the lines of cable 156 to OR circuit 158 giving rise to a second input to AND circuit 154 which enables that circuit to detect an error and energize the KEY OTHER THAN: REL, MBS, ER, HOME STRUCK AT COLUMN 80 amplifier 160.

Since there are only seven program instructions, represented by numbers 0, 1, 2, 3, 4, 5 and 6, no other characters should be entered when the mode switch 40 is in either the program entry or program verify positions 42, 66. All keys except keys 0—6 are monitored and if any one of those is struck a signal is delivered on one of the lines of cable 162 to OR circuit 164 which provides one input to AND circuit 166. If the mode switch 40 is in either the program entry 42 or program verify 66 position, a signal is delivered on one of lines 168, 170 to OR circuit 172 which provides an input to AND circuit 166 enabling it to detect an error and energize the NON-PROGRAM KEY STRUCK IN PROGRAM CONDITION amplifier 174.

During a tape read operation, if a record of fewer than seven characters or columns is encountered in a predetermined period counter-timer 176, responsive to output register 110, which receives the information read from tape 144, delivers a signal on line 178 to NOISE RECORD amplifier 180. Counter-timer 176 is then recycled after a predetermined period related to the normal timer required to detect an interrecord gap on the tape. This action is an example of an automatic recovery procedure which does not require the intervention of the operator.

If a record of more than 80 columns is encountered in a predetermined period counter-timer 176 delivers a signal on line 184 to gate 186 enabling that gate to energize LONG RECORD amplifier 188.

Since the ER and HOME keys 86, 92 are the only keys which are operable when tape is in motion and/or an automatic operation is being performed by the device, striking any key other than those when the READY sign 84 is out is detected as an error by AND circuit 190 which energizes the KEY OTHER THAN ER, HOME STRUCK WHILE READY IS OUT amplifier 192. The enabling inputs to AND circuit 190 include a signal on line 194 indicating that the READY sign 84 is out and an input from OR circuit 196 enabled by a signal from any of the other keys over line 198.

A signal enabling illumination of READY sign 84 is delivered to inhibit circuit 200 by operations control 20 via line 202 unless either an error has occurred as indicated by a signal on line 204 to OR circuit 206, or the tape is in motion as indicated by a signal from tape control 102 via line 208 to OR circuit 206. The occurrence of either of those signals causes OR circuit 206 to actuate inhibit circuit 200.

All information read in or read out of memory 106 passes through register 108, thus also through write circuit 146 and read circuit 210. During a verification operation a record is read from tape 144 by magnetic head 152 and is delivered by read amplifier 212, through register 110, controls 22, 20, register 108 and read circuit 210 to memory 106. Now as each column or character is rekeyed from the source document by the operator it appears in input-output register 108. As a character is shifted out of register 108 to be read into memory 106, the character in the corresponding position is shifted out of memory 106. Thus, the character read from tape or stored in memory to be verified and the verifying character entered from the source document are simultaneously available to comparator 214. A signal from comparator 214 is monitored on line 216 to keep control 20 appraised of the comparison operation and is monitored on line 218 to provide a signal to AND circuit 220. It the device is operating in program verify mode, a signal is delivered on line 222 to OR circuit 224, and if in the data verify mode a signal is delivered on line 226 to OR circuit 224. With either one of those signals present OR circuit 224 provides one input to AND circuit 220. If a no-comparison signal simultaneously appears on line 218, AND circuit 220 detects an error and is enabled to energize the COMPARE ERROR amplifier 228.

Each block or record of information read from tape 144 is provided with two classes of parity bits: frame bits and longitudinal bits. A frame parity bit accompanies each of the 80 6-bits characters and a longitudinal parity bit accompanies each of the six rows in a typical 80 column record. Each time a record is read from tape 144 parity is inspected by parity check circuit 230. Gate 232 is responsive to signals from circuit 230 on line 234 to detect an error if parity is improper. When gate 232 is enabled, it energizes the FRAME OR LONGITUDINAL PARITY amplifier 236.

During a tape read operation if a record is read which contains fewer than a full 80 characters, a signal on line 238 from output register 110 is detected as an error by gate 240 enabling that gate to energize the FEWER THAN 80 COLUMNS amplifier 242. This type of error is distinguished from the NOISE RECORD detection for in that case there are but six characters or fewer and they are interpreted as noise or interference on the tape, whereas the type of error dealt with here is an indication that the record is basically a valid one but a portion of it has been lost.

After the last column of a record has been entered in one of the entry modes, that information is released to tape. As soon as that record is placed on tape, the tape is backspaced and that record is read from tape and compared with the date stored in memory 106 from which the tape information was derived. The comparison is effected using comparator 214 as in the determination of the tape-memory compare error which caused amplifier 228 to be energized. Should the comparison not be satisfactory a signal on line 244 is delivered to AND circuit 246. If when this signal appears the device is in the data entry mode, a second signal appears on line 248 enabling AND circuit 246 to energize the BACKSPACE-READ MISMATCH amplifier 250.

There should be an erase current present in magnetic head 152 during writing on tape but not during reading from tape. If an erase current is sensed by monitoring line 252 while a read operation is being performed, as indicated by a signal on line 254 from tape control 102, AND circuit 256 is enabled. If monitoring line 258 senses that an erase current is not present, while a write operation is being performed, as indicated by a signal on line 260 from tape control 102, AND circuit 262 is enabled. If either AND circuit 256 or 262 is enabled, OR circuit 264 detects an error and is enabled to energize the ERASE CURRENT: PRESENT DURING READING NOT PRESENT DURING WRITING amplifier 266.

In this manner a plurality of errors are detected from the occurrence and concurrence of one or more of a multiplicity of conditions.

The error indicating outputs of amplifiers 124, 132, 140, 160, 174, 188, 192, 120, 228, 236, 242, 250, and 266 are grouped in various combinations according to the procedures required for recovery from that error, FIG. 5*b*.

Each of the amplifiers provides one input to OR circuit 276, so that whenever an error occurs CHECK sign 72 is illuminated. The CHECK Sign 72 is extinguished upon depression of ER key 86.

The outputs of amplifiers 124, 132, 140, 160, 174, 192, and 120 are delivered to OR circuit 278. Thus if any of the following errors occur, MULTIPLE KEY STRIKE, LOWER CASE KEY STRUCK IN UPPER CASE CONDITION, UPPER CASE KEY STRUCK IN LOWER CASE CONDITION, KEY OTHER THAN: REL, MBS, ER, HOME STRUCK AT COLUMN 80, NON-PROGRAM KEY STRUCK IN PROGRAM CONDITION, KEY OTHER THAN ER, HOME STRUCK WHILE READY IS OUT, or KEYBOARD C.C.U. PARITY, OR circuit 278 is enabled and ER sign 74 is illuminated. These errors have been grouped together because each of them may be remedied by depressing ER key 86 and rekeying the correct key. Thus, upon seeing the ER error indication the operator need only strike ER key 86 and continue entering information.

The output of amplifier 228 is delivered to ER/CORR sign 76. When, during a verification operation the record read from tape does not compare favorably with the verifying information, the proper procedure is to alter the information contained on the tape, which information in this operation in the device of this embodiment is actually in memory 106. Thus when such an error occurs, it is indicated to the operator by the illumination of the ER/CORR sign 76 which alerts the operator to the error condition and informs him that to remedy the error the ER key 86 and CORR key 88 are depressed simultaneously and then the correct information is entered in place of the erroneous information now contained on the tape.

Amplifiers 188, 236, 242, 250, and 266 each provide an output to OR circuit 280. Therefore, if any of the following errors occur: LONG RECORD, FRAME OR LONGITUDINAL PARITY, FEWER THAN 80 COLUMNS, BACKSPACE READ MISMATCH, or ERASE CURRENT PRESENT DURING READING NOT PRESENT DURING WRITING, the ER-REL sign 80 is illuminated. Those errors occurring in the data entry mode which cause the ER-REL sign 80 to be illuminated may be remedied, as indicated by the sign itself, by pushing the ER key 86 and then the REL key 38 to again release the record from memory to tape. This action causes the record to be erased from the tape and rewritten further along the tape, thus skipping over a faulty section of tape. If the error recurs, other measures may be necessary. When OR circuit 280 is enabled by the occurrence of one of the aforementioned error inputs, it provides an output to AND circuit 282. The other two inputs to AND circuit 282 are present when there is a signal on line 283 from AUTO DUP/SKIP switch 58 indicating that the switch is on and a signal on line 285 from data verify position 70 indicating that mode switch 40 is in the data verify mode. Under those conditions the AD/S OFF sign 78 is also illuminated informing the operator that the AUTO DUP/SKIP switch 58 must be turned off before the ER-REL procedures are begun.

In each instance when one or more of signs 72, 74, 76, 78, and 80 are illuminated, they are switched off only after the proper key or keys have been depressed in the correct sequence. Thus CHECK sign 72 is extinguished along with any other alerting devices by a signal on line 288, FIG. 5*b*, complete line not shown, from operations control 22 when the ER key 86 is depressed. ER sign 74 is also extinguished by a signal on line 288. The ER/CORR sign 76 is switched off when the ER key struck signal on line 288 and the CORR key struck signal on line 290 from control 22, complete line not shown, appear simultaneously to enable AND circuit 292. The ER-REL sign 80 is switched off when timed flip-flop 294 is first set by an ER key struck signal on line 288 and reset by a REL key struck signal occurring on line 296 from control 22, complete line not shown, within a predetermined period after the REL key struck signal appears. If timed flip-flop 294 is so reset and the AD/S OFF sign 78 had been concurrently illuminated, it too is switched off when the output of the timed flip-flop arrives at AND circuit 298 coincidentally with a signal on line 283 indicating that the AUTO DUP/SKIP switch 58 is off.

With this arrangement of the invention an operator need never know what the error was nor memorize or refer to a manual for recovery from errors incurred during operation of a key-to-tape recording device. The operator need only follow the instructions of the sign which alerted him to the presence of an error.

Although the invention has been portrayed as a part of an operator controlled key-to-tape recorder device having only a few types of errors and error recovery procedures, the invention is as well applicable to much larger machines, machines having far greater numbers of possible errors and recovery procedures and to machines which are totally or partially automatic. For example, the input to all the signs may instead be delivered to other circuits which will manipulate the proper keys or provide equivalent signals directly in the proper sequence.

Other embodiments will occur to those skilled in the art and are within the following claims:

We claim:

1. AN information processing device, including error processing apparatus comprising:
means for monitoring a predetermined set of conditions in said information processing device;
means, responsive to said means for monitoring, for detecting which one of a plurality of types of errors in said conditions exists, and
means, responsive to said means for detecting, for indicating the procedure for correcting the said type of error.

2. The device of claim 1 wherein said information processing device includes means for entering information to be processed, and means for recording said information on a recording medium; and wherein said means for monitoring is responsive to conditions relating to said information during said entry and recording.

3. The device of claim 2 in which said means for entering includes a keyboard.

4. The device of claim 3 further comprising memory means for controlling said means for entering and said means for recording; and for storing said information.

5. The device of claim 4 in which said recording medium is a magnetic medium and said means for recording includes magnetic head means and means for driving said medium and head means relative to one another.

6. The device of claim 5 further including means responsive to said memory means for verifying in verify mode said information entered in entry mode by said means for entering.

7. The device of claim 6 in which said means for indicating is a display means for providing a visual indication of the occurrence of an error and the required procedure for correcting that error.

8. The device of claim 6 in which said conditions monitored include:
parity values accompanying information processed in said device;
miskeying of said keyboard;
the size of units of information processed by said device;
the mode of operation of said device; and
differences between the information stored in said memory and in corresponding areas of said medium; and
said means for monitoring includes means for sensing each of said conditions.

9. The device of claim 8 in which said means for detecting includes means, responsive to each of said means for sensing, for identifying an error as a particular type of error.

10. The device of claim 9 in which said means for determining includes means for classifying errors identified by said means for identifying into groups responsive to common keyboard error correction procedures.

11. The device of claim 7 in which each said indication produced by said display means corresponds directly to visual indicia on one or more keys and switches on said keyboard.

12. The device of claim 7 in which said apparatus further includes means for resetting said display means in response to execution of the proper correction procedure.

13. A method for indicating errors in the operation of a keyboard operated digital data processing device comprising classifying error conditions into groups in accordance with recovery procedures for correcting the respective error conditions and providing displays each responsive to one of said groups of errors said displays indicating the procedures for recovering from said error conditions.

14. A method of indicating errors according to claim 13 in which the provision of displays includes actuating error signal devices to illuminate masks indicating the recovery steps required.

15. A method of indicating errors according to claim 14 in which said masks include legends corresponding to legends associated with manual controls on said keyboard.

16. In a system for recording information as digital data including a keyboard for entering said information, a recording device for recording said information, a memory for accumulating predetermined amounts of said information before transfer to said recording device, the improvement comprising: the combination in said keyboard of control keys, error correction keys and error indication device, said error indication devices indicating an error recovery procedure by directly specifying which of said keys are to be actuated for recovery from an error condition, and the sequence in which those keys are to be actuated.

17. In a system for recording information according to claim 16, the combination in which said error indication devices are light sources in combination with masks operative to display legends defining the recovery steps required.

18. In a system for recording information according to claim 16, the combination in which said error indication devices each comprise means for illuminating legends corresponding to legends on specific ones of said control keys and said error correcting keys required for recovery from the error condition.

19. In a system for recording information according to claim 16 the combination with said control keys of means to disenable the respective error indication devices when the specified keys are actuated in the required sequence.